Aug. 23, 1927.
C. H. McCULLOUGH
1,640,086
MOTOR CONTROL MECHANISM
Filed Dec. 12, 1925   5 Sheets-Sheet 2
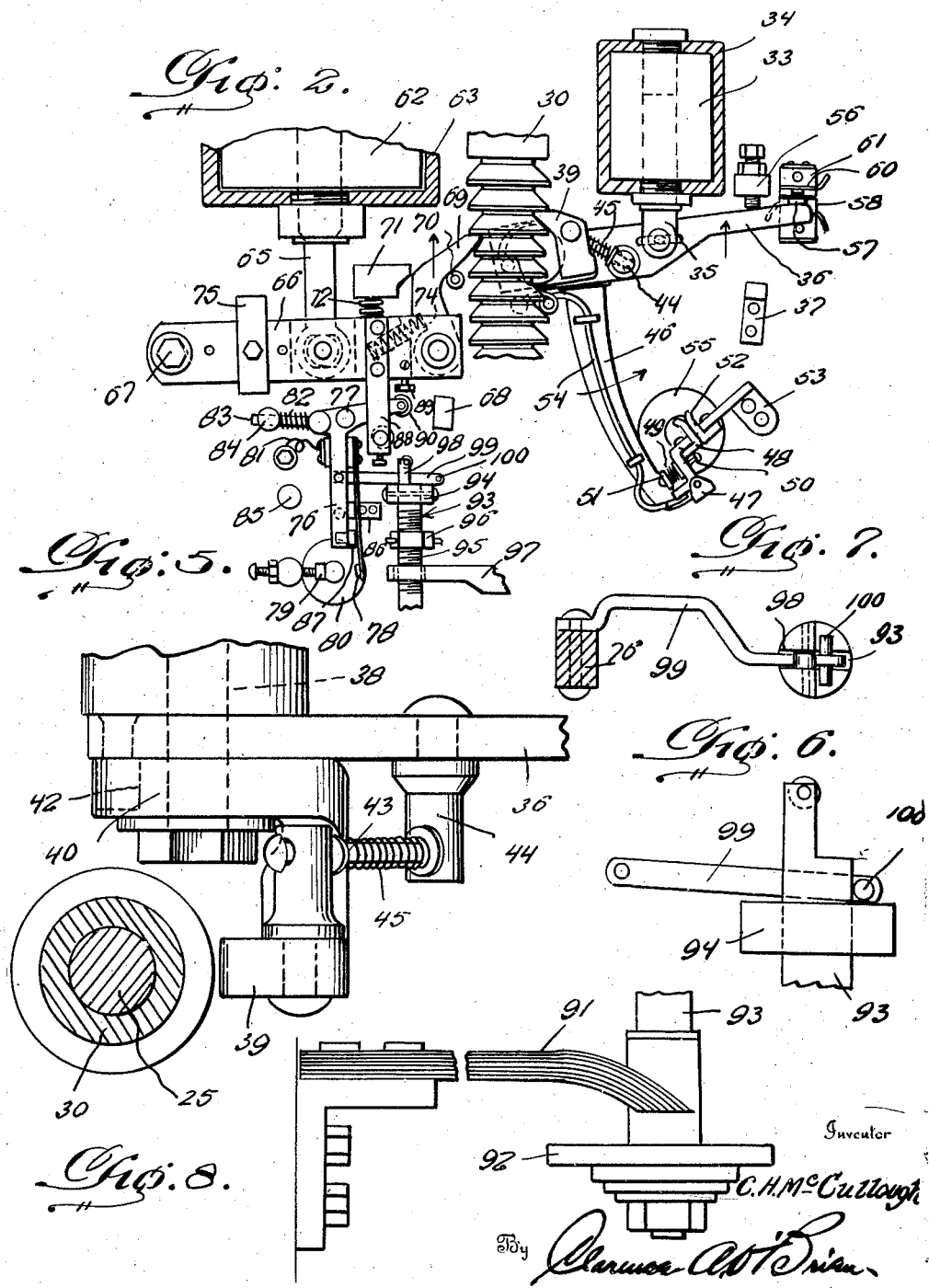

Aug. 23, 1927.
C. H. McCULLOUGH
1,640,086
MOTOR CONTROL MECHANISM
Filed Dec. 12, 1925      5 Sheets-Sheet 3
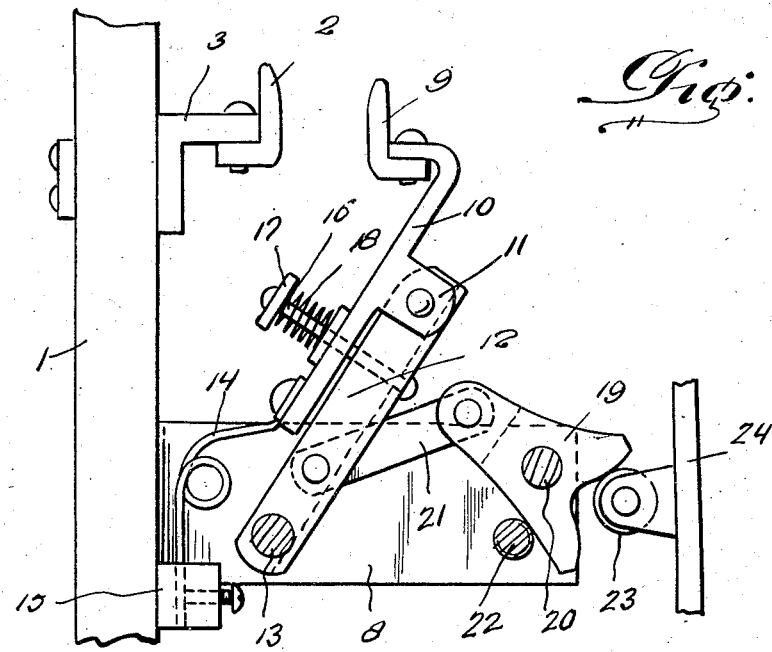
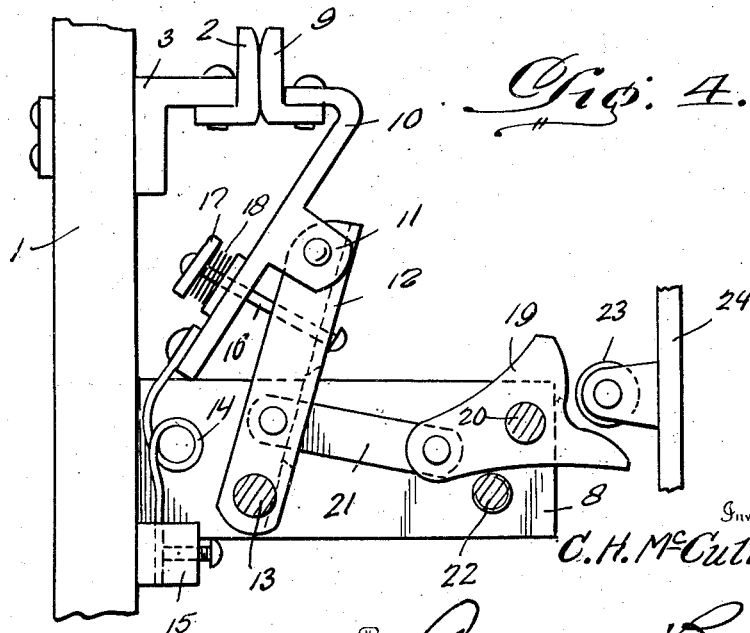
Inventor
C. H. McCullough
By Clarence A. O'Brien
Attorney Aug. 23, 1927.  
C. H. McCULLOUGH  
1,640,086  
MOTOR CONTROL MECHANISM  
Filed Dec. 12, 1925  
5 Sheets-Sheet 5

Inventor  
C. H. McCullough,  
By Clarence A. O'Brien  
Attorney

Patented Aug. 23, 1927.

1,640,086

UNITED STATES PATENT OFFICE.

CHARLES HAROLD McCULLOUGH, OF VISALIA, CALIFORNIA, ASSIGNOR OF ONE-HALF TO FRANK ELLIOTT, OF OROSI, CALIFORNIA.

MOTOR-CONTROL MECHANISM.

Application filed December 12, 1925. Serial No. 75,140

This invention relates to manually controlled automatic motor starting and controlling mechanism, adapted to operate a field rheostat for an electric motor.

An object of the invention resides in providing a device for controlling and operating a field rheostat having a plurality of independent switch mechanisms operable through the magnetic operation and control of suitable means in a predetermined order.

A further object of the invention resides in providing an operating mechanism for a field rheostat, which mechanism is normally operated in one direction and normally retained in a predetermined position and which is operated in the opposite direction through a step by step movement by suitably operating and controlled electro-magnetic mechanism, while a primary electromagnetic operating means serves to control the operation of the entire device and to retain the mechanism for operating the rheostat in any position of adjustment.

A further object of the invention resides in providing a mechanism for operating a field rheostat in which suitable means is operated electro-magnetically so as to produce a predetermined operation of the rheostat which is controlled by the counter electro-motive force of the controlled motor, while primary electro-magnetic means controls the operation of the entire mechanism and serves to retain the rheostat in a set position of adjustment, the primary electromagnetic control also forming a no voltage cut-out for the purpose of opening the circuit upon a failure of potential across the terminals of the circuit.

The invention further comprehends other improvements residing in the method of controlling the starting of the motor and maintaining a constant control thereof which are more particularly pointed out in the following description in detail and in the claims directed to a preferred form of construction, it being understood, however, that various changes in the size, shape and arrangement of the parts may be made for carrying out the essential operations without departing from the spirit and scope of the invention as herein set forth.

In the drawings forming part of this application:

Figure 1 is a front elevational view showing portions of the solenoid casings in section.

Fig. 2 is a view of a portion of the structure shown in Fig. 1, illustrating parts of the apparatus in one of its operative positions.

Fig. 3 is a side elevation of one of the rheostat controlling switches in open position.

Fig. 4 is a view similar to Fig. 3, showing the switch in closed position.

Fig. 5 is a plan view of the check pawl structure and support therefor, showing its relation with the operating arm.

Fig. 6 is a detail view showing the manner in which the series coil control switch retains the control switch for the operating solenoid in open position.

Fig. 7 is a top plan view of the structure shown in Fig. 6, with the parts in position to permit the operation of the operating solenoid control switch.

Fig. 8 is an edge view of the series control switch from the position shown in Fig. 1.

Figure 11:
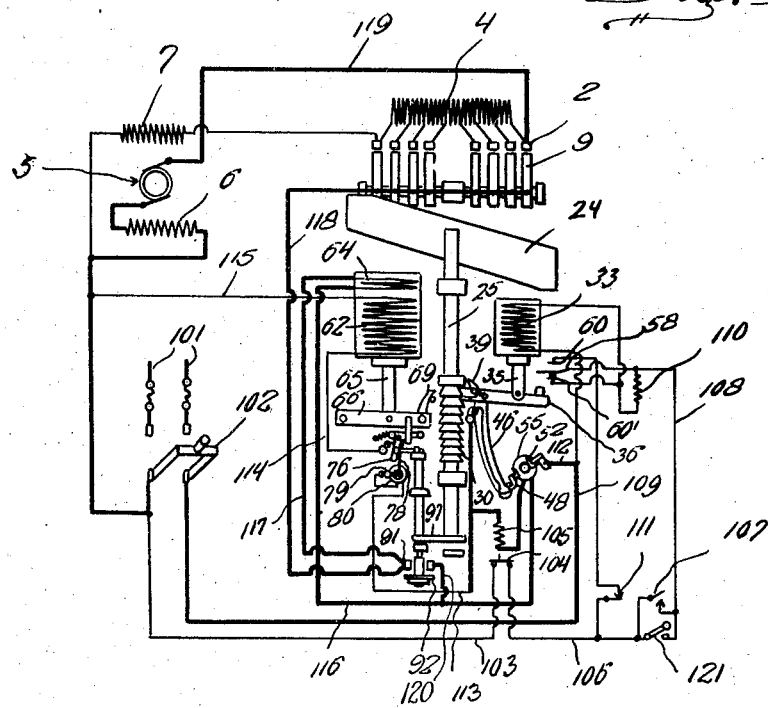
Fig. 11 is a wiring diagram of the circuit connections for the invention with a compound motor.
Figure 9:
Fig. 9 is a view of the switch mechanism associated with and operated by the primary electromagnet with the parts shown in normal position.
Figure 10:
Fig. 10 is a detail perspective of the switch arm carrying the movable contact operated by the primary electromagnet for controlling the circuit to the motor and operating solenoid.
Figure 12:
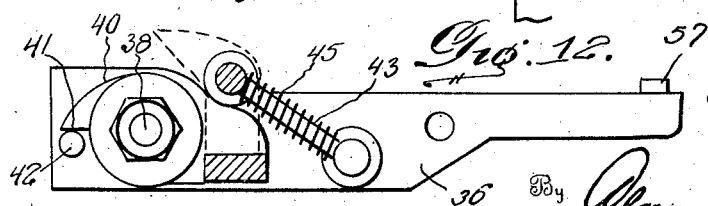
Fig. 12 is a detail view of an enlarged scale of the check pawl structure shown in Fig. 5.

Figs. 13 to 17 inclusive, illustrate the various relative positions between the rack bar, the check pawl, and the pawl on the operating arm, and showing the cooperation of the upper stop and coil spring for the operating arm and the pawl carried thereby.

A panel or suitable support is indicated at 1 on which the entire apparatus is mounted for operation. A plurality of stationary switch contacts are mounted in horizontally aligned and spaced relation, said contacts being indicated by the numeral 2 and suitably supported in insulated relation upon the angle member 3 which is secured to the panel 1 in any suitable manner and from which extend the leads to predetermined portions of the resistance unit 4 shown in Fig. 11, which is adapted to be interposed in circuit with the field windings of the compound motor 5 having the series field 6 and the shunt field 7. A plurality of supporting arms 8 are mounted in spaced relation on the panel 1 and project laterally therefrom for movably supporting a plurality of movable switch blades or contacts 9 corresponding in number to the contacts 2 and adapted for association and engagement with predetermined of the contacts 2. These contacts 9 are carried by switch members 10 having ears 11 projecting from the central portions thereof pivotally connected with the upper end of operating arms 12 which are in turn pivotally mounted at their lower ends on supporting rods 13 mounted in the arms 8.

The several switch members 10 are electrically connected by pigtails 14 with a bus bar 15 mounted on the panel 1 in order that circuit connections to each of the contacts 9 may be made in a manner as will be disclosed. The operating arms 12 are preferably constructed of some suitable non-conducting material. The operating arms 12 carry pins 16 which project through openings in the switch members 10 and carry the washers 17 at the outer ends thereof for retaining coiled springs 18 under tension between said washers and the switch members so that the switch members are normally retained in the position shown in Fig. 3 with the lower ends against the edge portion of the operating arm. This provides for the holding of the contacts 9 in firm engagement with the contacts 2 to close the circuits controlled thereby when the switch is moved to closed position as shown in Fig. 4 as the movement of the operating arm 12 is positioned to cause a pivotal movement of the switch member 10 thereon which compresses the coiled spring 18 in the manner as shown in Fig. 4. A plurality of forked members 19 are rotatably mounted on a rod 20 carried by the supporting arms 8 for independent operation, each of which members are connected by independent links 21 with the respective operating arms 12. A stop rod 22 is extended through the supporting arms 8 and is positioned so as to limit the rotative movement of the forked members 9 on the rod 20. In this connection, it will be noted that the coiled spring 18 in the closed position of the switch as shown in Fig. 4, normally tends to operate the arm 12 in such a manner that a quick opening of the switch will be effected, the switch being maintained in closed position by the pivot of the link 21 with the forked member 19 positioned across the center line joining the rod 20 with the pivotal connection of the link and the operating arm of the stop rod 22 limits the movement past the center line so that the contacts 2 and 9 are maintained in engaged relation.

The coiled spring will start the opening operation of the switch from the position shown in Fig. 4, immediately upon the pivot between the link and the forked members being moved past the center line from the position shown in Fig. 4, as a result of which, a quick opening will be effected and the parts moved into the position shown in Fig. 3. The weight of the switch member and the operating arm will also aid in returning the switch to open position by gravity.

The forked members 19 have their forked ends projecting beyond the ends of the supporting arms 8 for cooperation with rollers 23 mounted on the plate 24 which is carried by the main operating member or shaft 25. This shaft 25 is slidably mounted in bearings 26 secured to the panel 1 and is limited in its downward movement under the action of gravity by the stop 27 which may be of suitable resilient material to cushion and absorb the impact from the shaft, which stop is supported by the bracket 28 mounted on the panel 1.

An annular shoulder is formed on the shaft 25 at 29 and below the annular shoulder 29 a rack bar 30 of annular form is slidably mounted on the shaft and cushioned in its upward movement against the shoulder by the cushioning spring 31, while the downward movement on the shaft is limited by the collar 32 adjustably mounted on the shaft.

A primary electromagnetic control mechanism is operated by the electromagnet 33 mounted in the housing 34 carried by the panel 1 and which is adapted to operate the armature 35 to which is pivotally connected the check pawl operating arm 36. The end of armature 35 is transversely slotted to compensate for the relative movement between the armature and arm 36. This arm 36 is provided with a stop 37 mounted on the panel 1 for limiting its downward movement about the pivot on the pin 38 while the check pawl 39 is also pivotally mounted on the pin 38 and has a plate portion 40 formed with a shoulder as at 41 with which engages the pin 42 carried by the operating arm 36. In the downward movement of the check pawl operating arm 36 about the pivot pin 38, it will be seen that the pin 42 engages the shoulder 41 and moves the check pawl 39 to a position as shown in Fig. 1, which is in disengaged relation with the rack bar 30. A rod 43 is pivotally connected to the check pawl 39 and extends through the stud 44 on the operating arm 36 for sliding movement therethrough, and on which is mounted the coiled spring 45 normally under compression between the check pawl and the stud 44 so as to maintain the shoulder 41 in engagement with the pin 42.

The coiled spring 45 serves to engage the check pawl 39 with the notches or annular recesses in the rack bar 30 when the operating arm 36 is moved to the upper position due to the energization of the electromagnet 33. In this position of parts, the pin 42 will not ordinarily be engaged by the shoulder 41. The weight of the operating arm 36 and the elements carried thereby are normally sufficient to disengage the check pawl 39 from any notch in the rack bar 30 so that upon de-energization of the electromagnet 33, the parts will move to the position shown in Fig. 1, so that the shaft 25 may move by gravity to the lowest position with the lowest end in engagement with the stop 27.

The check pawl operating arm 36 carries a switch arm 46 which depends therefrom and has a lateral extension 47 at the lower end which pivotally receives a movable switch contact 48 normally projected by the coiled spring 49 and limited in its movement by the pin 50, extending through the mounting for the contact and the lug 51 on the arm 46. This coiled spring 49 cushions the impact of the contact 48 with the stationary contact 52 carried by the supporting bracket 53 secured on the panel 1, and further serves in the engaged position of said contact to maintain the movable contact 48 in engagement with the contact 52. The arm 46 may be constructed of suitable insulating material while a flexible wire 54 connected with the contact 48 extends to and is connected with a terminal on the panel 51 as shown in dotted lines in Fig. 1, so that a suitable circuit connection may be made with the movable contact.

A blow-out magnet is indicated at 55 which is connected in circuit in a predetermined manner as will be described for blowing out the arc across the points 48 and 52 in the opening of the circuit controlled thereby.

An adjustable stop mechanism at 56 limits the upward movement of the check pawl operating arm by the action of the electromagnet 33 and a stud 57 is positioned to engage the resilient arm 58 carrying the contacts 59 which are adapted to engage the contacts 60 on the resilient members positioned above and below the resilient arm 58, the arms 58 and 60 being mounted in spaced and insulated relation in the support 61 carried by the panel 1. The resilient arm 58 is mounted in the support 61 in such a manner that it normally tends to engage the contact 59 on the lower face thereof with the lower contact arm 60′, while the check pawl operating arm serves to move the resilient arm 58 upwardly in the energized position of the electromagnet 33 for engaging one of the contacts 59 with the contact of the upper arm 60.

This primary magnetically operated control mechanism as above described, controls the operation of the entire mechanism and also of the motor, the check pawl 39 of the mechanism cooperating with the rack bar 30 to retain the same in any position of the stepped operation thereof when the electromagnet 33 is energized.

The electromagnetic operating mechanism includes the operating solenoid 62 mounted in the housing 63 carried by the panel 1, and above which is also mounted the series control solenoid 64 which operates the armature 65 pivotally connected with the operating arm 66 pivotally mounted on the panel 1 at 67. The connection between the armature 65 and the operating lever 66 is such as to permit a free movement between the armature and the lever so that the sliding movement of the armature through the solenoid 62 may be compensated for by the relative movement of the pivotal connection out of axial alinement with the armature.

A stop 68 limits the downward movement of the operating arm 66 which carries at its free end the operating pawl 69 having one face positioned for engagement with the roller 70 serving to disengage the pawl from any notch of the rack bar 30 in which it may be engaged in the downward movement of the shaft 25. A stop 71 carrying a coiled spring 72 limits the upward movement of the arm 66 by the operation of the solenoid 62 in a special manner which is shown in Figs. 13 to 17 inclusive, and which will now be described.

Figure 13:
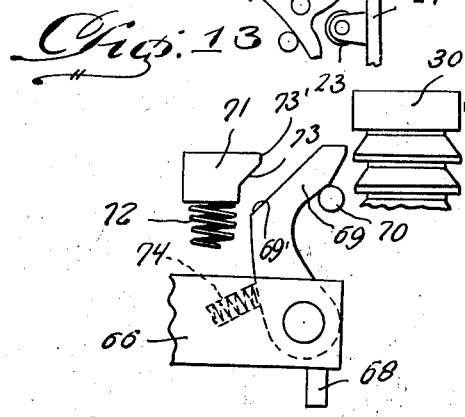

Figure 13 illustrates the operating arm 66 in the lowermost position as it rests on stop 68. The roller 70 in the downward movement of the operating arm, engages the under side of the operating pawl 69 and causes the same to be moved out of any notch in the rack bar 30 so that the rack bar may be moved downwardly when the current to the motor is shut off as will be described.

The rear side of the operating pawl 69 is provided with an inclined shoulder 69′, the rear end of which lies directly under and in line with the inclined face 73 of the stop 71. This face 73 is positioned to be at a point slightly in advance of the upward limit of movement of the operating arm 66. Upon energization of the operating solenoid, the upward motion of the operating arm 66 is rapid, and the coiled spring 74 operates to project the pawl 69 into one of the notches in the rack 30 so that the rack bar will be moved upwardly through one step of movement.

Figure 14:
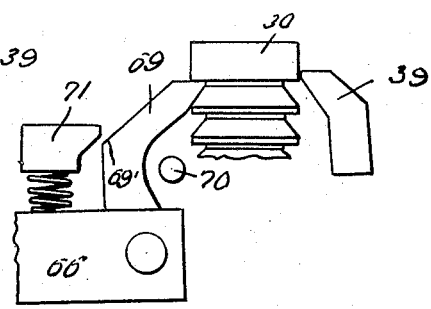

Fig. 14 illustrates a position of the operating arm and the pawl 69 in advance of the upper limit of movement and at the time that the operating arm engages the spring 72. It is about this time that the switch lever 76 is operated so that before the lever reaches the position shown in Fig. 15, the circuit to the operating solenoid 62 will be broken. This is in order that the rapid upward movement of the shaft 25 and the rack bar 30 may be arrested as well as the upward movement of the operating arm 66 to prevent the movement of the shaft beyond a predetermined point in order that only one switch will be closed for each operation of the operating arm. Should the upward force of the shaft be sufficient to move the same upwardly an abnormal distance, the pawl 69 will be projected into rigid engagement with the rack bar 30 by the face 73 of the stop 71 while the shoulder 69' will move past the end of the stop 71 as illustrated in Fig. 15 for holding the pawl in this rigid relation with the shaft.

Figure 15:
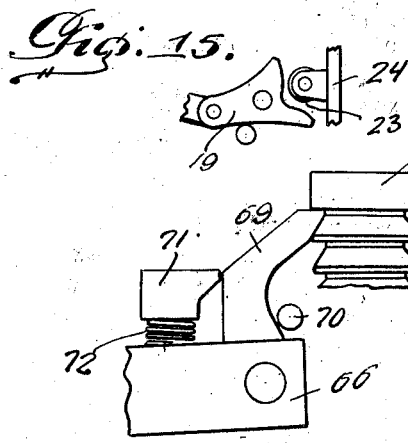
Figure 16:
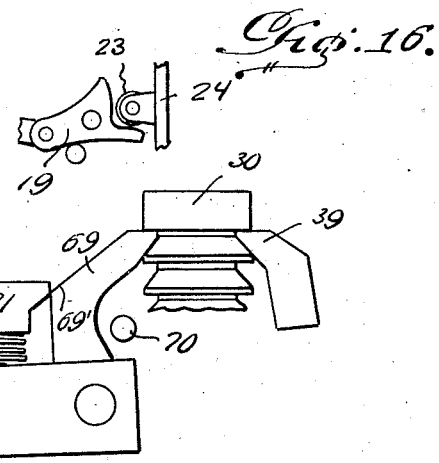

Fig. 15 illustrates this upper limit of movement and in which the coiled spring 72 serves to arrest the movement of the operating arm 66 as well as the shaft 25. In this position of the parts, as shown in Fig. 15, in which the operating coil 62 has become de-energized, it is to be understood that the series coil 64 does not exert sufficient operative power on the operating arm to retain it in this position so that it will drop slightly into the position shown in Fig. 16 and rest on the check pawl 39 which has become engaged with one of the notches of the rack bar. In this position of the parts, the spring 72 will be maintained under tension so that the operating arm will be given a quick start downward when the current in the series coil has been reduced to a predetermined amount in relation to the adjustment of the weight 75 on the arm 66 so as to produce the proper timed operation of the whole mechanism.

Figure 17:
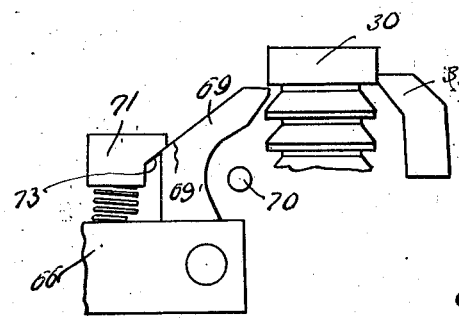

Fig. 17 illustrates the position of the parts similar to Fig. 14 showing the operation of the inclined face 73 of the stop 71 serving to force the pawl 69 into full engagement with one of the teeth of the rack bar for insuring the positive operation of the rack bar and shaft 25 in each operation of the operating arm 66.

The operating magnet control switch includes an inverted L-shaped lever member 76 pivotally mounted on the panel at 77 carrying the resilient switch blade 78 adapted for engagement with the adjustable contact 79 carried by the panel 1. A blow-out magnet 80 serves to prevent arcing between the switch blade 78 and the contact 79 in the opening movement of the switch blade for opening the circuit controlled thereby. A flexible pigtail connection 81 electrically connects the switch blade 78 with a terminal on the panel 1 so that the switch blade may be interposed in a suitable electric circuit as will be described.

The lever 76 is retained in one of two positions through the operation of the coiled spring 82 mounted on the rod 83 slidable through the pin 84 on the panel and pivotally connected at its opposite end to a heel extension on the said lever. By this construction the pivotal connection of the rod 83 with the lever will move to one side or the other of the center line between the pivots and the center of the post 84 so that the lever will be retained by the action of the spring 83 in one of two positions which will be hereinafter described. A stop 85 limits the movement of the lever 76 in one direction by engagement with the long arm thereof while the stop 86 limits the movement of the lever in the opposite direction through engagement with the opposite side of the lever at one side of said switch blade. The end of the long arm of the lever carries the stud 87 which is adapted for engagement with the resilient switch arm 78 to disengage the same from the contact 79 in the position of the parts as shown in Fig. 2. This illustrates the retained position of the lever under the operation of the spring 82 for opening the circuit to the operating magnet 62, while Fig. 1 illustrates the other position of the lever 76 when the circuit controlled by the resilient switch arm 78 is closed.

The operation of the lever to the two positions just described is effected by the operation of the arm 66. A depending arm 88 on the operating arm 66 carries a roller at the lower end thereof adapted to engage the under side of short arm of the switch lever 76 so that in the upward movement of the operating arm 66, the switch lever 76 will be operated slightly before the end of the stroke of the operating lever so that it will change from the position shown in Fig. 1 to that shown in Fig. 2. Upon the subsequent downward movement of the operating arm 66, the set screw 89 will engage the roller 90 in the end of the short arm of the switch lever 76 and when nearing the lower limit of its movement will cause the switch lever 76 to be moved from the position shown in Fig. 2 to the position shown in Fig. 1.

A pair of resilient stationary switch blades 91 are mounted in spaced relation on the panel 1 and project laterally therefrom for engagement with and by the annular series coil cut out switch 92 which is mounted on the sliding rod 93 slidable in guides 94 on the panel 1. The central portion of the rod 93 is threaded as indicated at 95 and adjustably mounts a nut 96 adapted to be engaged by the operating arm 97 mounted on the lower end of shaft 25 so that as the shaft reaches its upper limit of movement, it will be engaged with the nut 96 and move the shaft 93 upwardly to bring the switch member 92 into engagement with the resilient switch blades 91 for the purpose of closing a circuit to short circuit the series coil 64 in a manner which will be described.

The upper end of the rod 93 is provided with a cut away portion which is centrally slotted as indicated at 98 and receives the end of a link 99 pivotally connected to the long arm of the switch operating lever 76. The free end of this link 99 extends through the slotted portion 98 and has a cross pin 100 mounted in the end adapted to hold the lever 76 in the position as shown in Fig. 6, when the rod 93 is moved to the upper limit of its position as shown in Fig. 6, to prevent the lever from moving so that the switch blade can not engage contact 79.

Referring particularly to the wiring diagram in Fig. 11, a current supply circuit from a suitable source of energy is indicated at 101 controlled by a cut off switch indicated at 102 for cutting off the energy to the motor 5 when desired. The parts as shown in Fig. 11 are in the idle position of the motor so that upon closing the circuit to the source of power by closing the switch 102, the current will be supplied by the wire 103 to the switch 104 controlled by the overload relay 105. From the contacts controlled by the overload relay 105, which contacts are indicated by the numeral 104, the circuit is made with the wire 106 to the starting switch 107 and from there through the wire 108 to the resilient contact 58 which in its normal position engages the stationary contact 60' and closes the circuit through the electromagnet 33 of the primary control mechanism, the return circuit for the electromagnet being through the wire 109. Upon the energization of the electromagnet 33 the primary control mechanism is drawn into operative position which is shown in Fig. 2, as a result of which the stud 57 engages the resilient member 58 and causes the contact 59 thereof to engage the stationary resilient contact member 60 which changes the circuit to the solenoid 33 so that the same becomes energized through the resistance 110. The engagement of the contact member 58 with the member 60 places the stop control switch 111 in circuit, the opening of which will de-energize the electromagnet 33 and permit the return of the parts to the position shown in Fig. 1, opening the circuit to the motor.

The movement of the primary control apparatus to the position shown in Fig. 2 by the energization of the electro-magnet 33 places the check pawl 39 in position to engage the notches in the rack bar 30 and normally maintain the spring 45 under compression. The arm 46 also moves with the operating arm 36 to engage the movable contact 48 with the stationary contact 52, thereby closing the circuit through the wire 112, wire 113 to blow-out magnet 80 to contact 79, switch blade 78 to wire 114, which is connected to the main operating solenoid 62. A connection 115 extends from the solenoid 62 to the other side of the circuit providing a return connection for the circuit. This energization of the operating solenoid 62 effects an upward movement of the armature 65 and the operating arm 66 as a result of which the pawl 69 carried by the operating arm engages the first notch of the rack bar moving the same upwardly one step of movement so that the check pawl 39 will move into this first notch and retain the shaft in said position. As the arm 66 nears the upper end of its stroke of movement, it engages the coiled spring 72 which cushions the movement and places this spring under tension while the depending arm 88 engages the operating lever 76 for the switch 78 and moves the same to the position shown in Fig. 2. This breaks the circuit to the operating solenoid 62 but as a result of the upward movement of the shaft 25 one step, one of the rollers 23 on the plate member 24 engages a predetermined forked member 19 and closes one of the switch connections controlling the resistance, and thereby closes the circuit to the series control coil 64. This circuit extends from the wire 113 through the solenoid winding 105 of the overload relay to the blow-out magnet 55 and from there through the wire 116 to the series coil 64 from which a wire 117 extends to one of the contacts 91 and then through the wire 118 to the bus bar 15.

The circuit from this point extends through the closed switch connection to the shunt field 7 from which the circuit returns to the opposite side of the source of power. A circuit is also completed through the resistance 4, the wire 119 to the armature of the motor and the series field 6 from which the return connection extends to the return circuit of the source of power. As a result of the energization of the series coil 64 the operating arm 66 will be maintained in its raised position as shown in Fig. 2 until the motor gains sufficient speed to generate a counter electro-motive force which neutralizes the current flowing through the series coil and thereby reduces the magnetic holding power thereof and permits the return of the arm 66 to the position of Fig. 1. This return movement is assisted by the weight of the armature together with the weight 75 thereon and the action of the spring 72 starting the downward movement of said arm 66.

As the arm nears its lowermost position of movement, the screw member 89 will engage the roller 90 so that the switch control lever 76 will be moved from the position of Fig. 2 into that of Fig. 1. This return of the switch control lever 76 to the position shown in Fig. 1, will cause the resilient switch arm 78 to close the circuit controlled thereby through engagement with the contact 79 and thus again energize the operating solenoid 62.

As a result of the second energization of the operating magnet 62, the shaft 25 will be moved upwardly another step through the engagement of the pawl 69 with the second notch of the rack bar 30. Through the energization of the series coil 64 in the manner as above explained, the operating arm 66 will not return to the lower portion as shown in Fig. 1, until the motor has picked up sufficient additional speed to generate counter electro-motive force enough to neutralize the action of the coil 64. This operation will be repeated until each of the several switches controlling the resistance 4 have been closed, at which time the full current supply from the source of power 101 will be applied across the terminals of the motor 5. In the last step of movement of the shaft 25 for operating the last switch of the series, the operating arm 97 carried by the shaft will engage the nut 96 and move the rod 93 upwardly. As this last step of motion is completed, the rod 93 will be moved upwardly so that the member 92 engages the contacts 91.

Upon this engagement of the switch member 92 with the contacts 91, the series coil 64 is short circuited and the circuit made directly from the wire 112 through the contacts 52 and 48 to the winding of the overload relay 105, therethrough the blow-out magnet 55 from which the circuit extends through wire 116 and 120 to one of the contacts 91 through the switch 92 to the other contact 91 and then through wire 118 directly to the wire 119 and to the motor 5 from which circuit connections are made as indicated in Fig. 11, to the return side of the circuit of the source of power.

In this way it will be seen that all of the operating mechanism for the shaft 25 is cut out of circuit and that only the primary control mechanism operated by the electro-magnet 33 is maintained in operative condition.

Should the stop switch 111 or the main control switch 102 be opened, the electro-magnet 33 will become de-energized, permitting the dropping of the operating arm 36 under the action of gravity, the opening of the circuit to the motor, and the release of the shaft 25 which will return by gravity to the lowermost position such as shown in Fig. 1.

Should the circuit be closed through the electro-magnet 33 by the operation of the starting switch 107 before the shaft 25 reaches its lowermost position, the check pawl 39 will immediately engage the nearest notch of the rack bar 30 while the operating mechanism controlled by the electro-magnet 62 will operate in the manner as above described, to return the shaft 25 to the uppermost position for applying the full power of the circuit 101 to the motor. If continuous automatic operation of the mechanism is desired, the switch 121 is closed insuring this automatic operation except for the control by the switch 102.

Upon the upward movement of the rod 93 by the operation of the operating arm 97 on the shaft 25 as the last switch is closed as above set forth, the upward movement will act to prevent the switch control lever 76 from returning to the position shown in Fig. 1 thru the engagement of the cross pin 100 beyond the periphery of said rod 93 as shown in Fig. 6. This will maintain the operating solenoid in de-energized position. As soon, however, as the shaft 25 drops one notch, the switch 92 will be disengaged from the contact 91 and the upper end of the rod 93 will move below the guide 94 so that the link 99 will be permitted to move with the switch lever 76 so that the same may move the contact 78 into engagement with the contact 79.

The primary control apparatus operated by the electro-magnet 33 in addition to controlling the operation of the operating solenoid 62 also forms a no voltage release which permits the opening of the circuit by the return of the arm 36 to its lowermost position as shown in Fig. 1, and resulting in the opening of the motor circuit.

From the above description, it should thus be understood that a motor control mechanism has been provided in which the period of operation of the operating magnet 62 will be controlled by the building up of the counter electro-motive force of the motor as well as the fact that the electro-magnet 33 forms a primary control mechanism for the entire apparatus as well as a no voltage release and cut-out.

Having thus described my invention, what I claim as new is:—

1. A motor control mechanism, comprising a rheostat, for starting and controlling the operation of an electric motor, a reciprocating member for operating said rheostat gravity operated in one direction and having a rack member thereon, an oscillating mechanism for engagement with said rack member to produce a step by step operation of said reciprocating member in an opposite direction, electromagnetic means for operating said oscillating mechanism, means for controlling the operation of said oscillating mechanism, and primary electromagnetic control means for controlling said electro-magnetic means, said motor and the gravity operation of said reciprocating member, said primary electromagnetic control means forming a no voltage cut-out.

2. A motor control mechanism, comprising resistance units adapted to be connected in or cut out of circuit with the motor, a support, a plurality of switches mounted on said support controlling said resistance units; operating means for the switches, including a shaft mounted for reciprocation on said support having means thereon for engaging and operating said switches in the movement of the shaft, a rack bar mounted on the shaft, said shaft being normally operable in one direction by gravity, for operating said switches to connect the resistance units in circuit with the motor, stop means for limiting the gravity actuation of the shaft; a primary control mechanism for said shaft including a pivoted operating arm, gravity actuated to an inoperative position, a check pawl pivotally mounted on said arm and spring pressed toward said rack bar adapted to retain the shaft in any position of adjustment against gravity actuation when said operating arm is in operative position, electro-magnetic means energizable to move said operating arm to operative position, and a switch arm carried by the operating arm and closing a main current supply circuit to the motor in the operative position of said operating arm; and means for producing a step by step operation of the shaft in the opposite direction for operating said switches to cut the resistance units out of circuit with the motor, said means being controlled by said primary control mechanism.

3. A motor control mechanism, comprising resistance units adapted to be connected in and cut out of circuit with the motor, a plurality of switches controlling connection of said resistance units in circuit with the motor; operating means for the switches, including a reciprocable shaft having means thereon for successively operating said switches, said shaft being normally gravity actuated in one direction to operate the switches for connecting the resistance units in the motor circuit; means for operating said shaft in a step by step movement to cut said resistance units out of circuit with the motor; and a primary control mechanism including an electromagnet, a stationary switch contact, a pivoted operating arm normally movable into an inoperative position, said electromagnet moving said operating arm into operative position when energized, means operated by said operating arm for engaging and retaining said shaft against gravity actuation in the operative position of said operating arm, and a movable switch contact operated by said operating arm in the operative position to engage said stationary contact, said movable and stationary contacts being adapted to control the motor circuit.

4. A motor control mechanism comprising a rheostat in the motor circuit, means for operating said rheostat to vary the resistance of the motor circuit, electromagnetically operated control means for the motor, and first-mentioned means, a starting circuit having circuit closer included therein for primarily inserting the last mentioned means in circuit with a source of energy, a second circuit with the last-named means including a circuit opener, and a resistance, and means normally closing the starting circuit operable by said electromagnetically operated control means for closing the second circuit and opening the starting circuit.

5. A motor control mechanism, comprising resistance units adapted to be connected in and cut out of circuit with the motor, a plurality of switches controlling connection of said resistance units in circuit with the motor; operating means for the switches including a reciprocable shaft having means thereon for successively operating said switches, said shaft being normally gravity actuated in one direction to operate the switches for connecting the resistance units in the motor circuit; and a rack bar on said shaft, electro-magnetic operating mechanism for operating said shaft in a step by step movement to cut said resistance units out of circuit with the motor including, a movable operating arm normally operated in one direction by gravity, a pawl pivotally mounted on said arm normally projected for engagement with said rack bar, means for disengaging the pawl from the rack bar in one position of said operating arm, a solenoid energizable to move said operating arm in the opposite direction and move the shaft a predetermined distance through engagement of said pawl with said rack bar, means operable to force the pawl to engage the rack bar when the operating arm is moved by the solenoid, said means cooperating with the pawl to prevent an abnormal movement of the shaft, and a switch operated by said operating arm to control energization of said solenoid; and a primary control mechanism for the motor and electro-magnetic operating mechanism.

6. A motor control mechanism, comprising resistance units adapted to be connected in and cut out of circuit with the motor; a plurality of switches controlling connection of said resistance units in circuit with the motor; operating means for the switches including reciprocable shaft having means thereon for successively operating said switches, said shaft being normally gravity actuated in one direction to operate the switches for connecting the resistance units in the motor circuit; and a rack bar on said shaft, electro-magnetic operating mechanism for operating said shaft in a step by step movement to cut said resistance units out of circuit with the motor including a movable operating arm normally operated in one direction by gravity, a pawl pivotally mounted on said arm normally projected for engagement with said rack bar, means for disengaging the pawl from the rack bar in one position of said operating arm, a solenoid energizable to move said operating arm in the opposite direction and move the shaft a predetermined distance through engagement of said pawl with said rack bar, means operable to force the pawl to engage the rack bar when the operating arm is moved by the solenoid, said means cooperating with the pawl to prevent an abnormal movement of the shaft, and a switch operated by said operating arm to control energization of said solenoid; electro-magnetic means for governing the operation of said operating mechanism, circuit closing means operable by said shaft when the last resistance unit is cut out of circuit for rendering the last-named means inoperative; and a primary control mechanism for the motor and electro-magnetic operating mechanism.

7. A motor control mechanism, comprising resistance units adapted to be connected in and out of circuit with the motor, a plurality of switches controlling connection of said resistance units in circuit with the motor; operating means for the switches including a reciprocable shaft having means thereon for successively operating said switches, said shaft being normally gravity actuated in one direction to operate the switches for connecting the resistance units in the motor circuit and a rack bar on said shaft; electro-magnetic operating mechanism for operating said shaft in a step by step movement to cut said resistance units out of circuit with the motor including a movable operating arm, normally operated in one direction by gravity, a pawl pivotally mounted on said arm normally projected for engagement with said rack bar, means for disengaging the pawl from the rack bar in one position of said operating arm, a solenoid energizable to move said operating arm in the opposite direction and move the shaft a predetermined distance through engagement of said pawl with said rack bar, means operable to force the pawl to engage the rack bar when the operating arm is moved by the solenoid; and a primary control mechanism for the motor and electro-magnetic operating mechanism.

In testimony whereof I affix my signature.

CHARLES HAROLD McCULLOUGH.